R. LUCKENBACH.
CONCENTRATING AMALGAMATOR.
APPLICATION FILED DEC. 3, 1910.
1,001,057.
Patented Aug. 22, 1911.
2 SHEETS—SHEET 2.
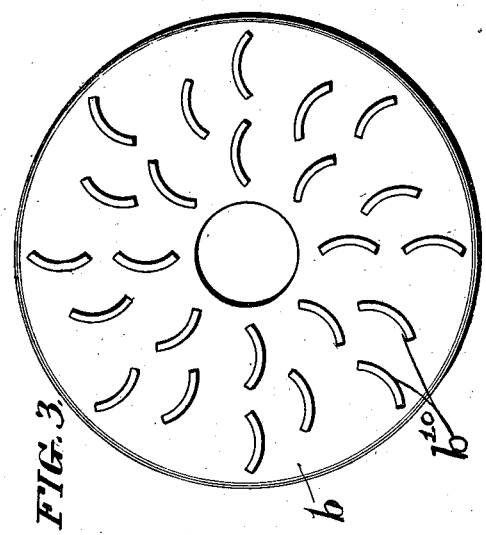
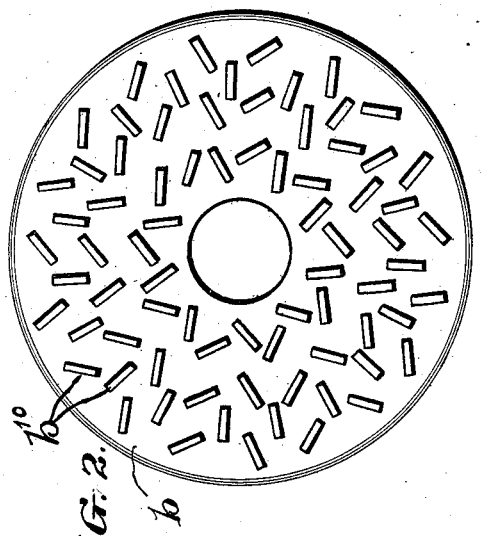
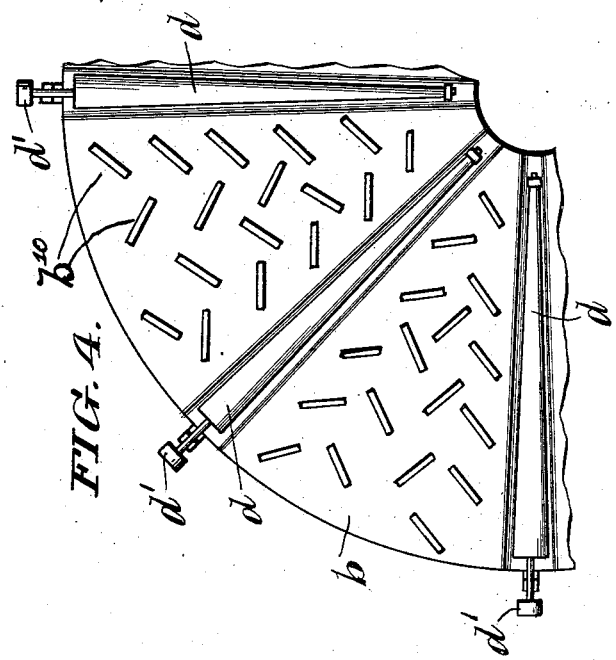
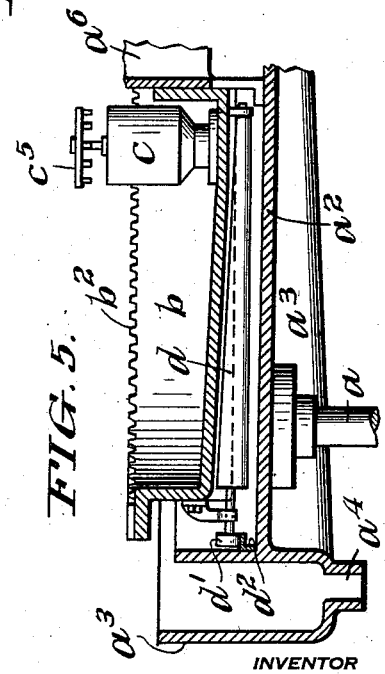

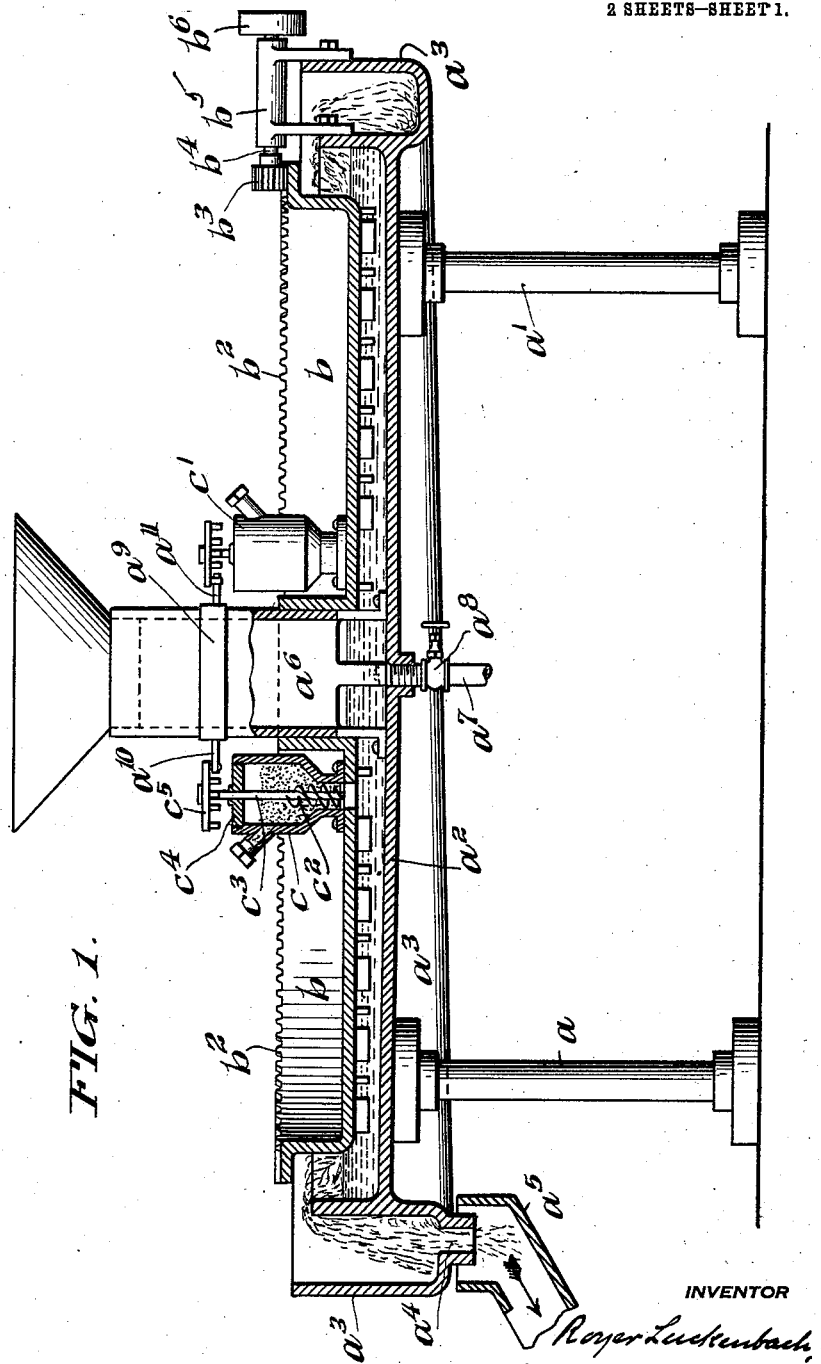

UNITED STATES PATENT OFFICE.

ROYER LUCKENBACH, OF COLWYN, PENNSYLVANIA.

CONCENTRATING-AMALGAMATOR.

1,001,057.  Specification of Letters Patent.  Patented Aug. 22, 1911.

Application filed December 3, 1910.  Serial No. 595,362.

*To all whom it may concern:*

Be it known that I, ROYER LUCKENBACH, a citizen of the United States, residing at Colwyn, in the county of Delaware and State of Pennsylvania, have invented certain new and useful Improvements in Concentrating-Amalgamators, of which the following is a specification.

My invention has relation to means for facilitating agitation and concentration by amalgamation of entrained values of wet metallic ore or pulp in a body of mercury or amalgam contained in a receptacle in which said means revolves and at the same time is fed step-by-step an amalgamating compound to the body of the receptacle to facilitate the concentrating of entrained values of the ore or pulp by amalgamation, while at the same time, tailings or gangue are freed at intervals in revolutions of the said means and by gravity discharged from the apparatus.

The nature, scope and characteristic features of my invention, will be more fully understood from the following description taken in connection with the accompanying drawings forming part hereof, in which—

Figure 1, is a vertical longitudinal central sectional view of a concentrating-amalgamator embodying main features of my invention. Figs. 2 and 3, are plan views of two different forms of lugs or projections arranged on the bottom of the rotating means to agitate and concentrate entrained values of the ore or pulp in a body of amalgam or mercury contained in a dish-shaped receptacle of the apparatus. Fig. 4, is a similar view in broken section, of still another form of revolving agitating and concentrating means, showing the staggered relation of the lugs or projections on the bottom thereof and also showing the cone-shaped rollers employed in conjunction with said means to facilitate agitation as well as concentration of entrained values of the wet ore or pulp by the amalgamation; and Fig. 5, is a vertical longitudinal central broken sectional view of the apparatus of Fig. 1, modified as to the rotary agitating and concentrating means, and in form as illustrated in Fig. 4, to facilitate agitation as well as concentration by amalgamation of entrained values of wet ore or pulp.

Referring to the drawings $a$ and $a^1$, are standards on which a dish-shaped trough $a^2$, is mounted to contain a body of mercury or amalgam as illustrated in Fig. 1. This trough has formed therewith a peripheral inclining gutter $a^3$, wherein is provided an outlet $a^4$, leading to a discharge spout $a^5$. Into the gutter $a^3$, from the trough $a^2$, tailings or gangue overflows in the direction of the outlet $a^4$. Centrally of the trough $a^2$, is located a feed-hopper $a^6$, resting on the floor of the trough $a^2$. In the bottom of the trough $a^2$ is provided an outlet pipe $a^7$, having a stop-cock $a^8$, so as to permit of discharge of mercury or amalgam from the trough $a^2$, therethrough. The hopper $a^6$, is provided with a collar $a^9$, having projecting pins $a^{10}$ and $a^{11}$, for a purpose to be presently explained.

$b$, is a deflecting agitator and concentrator loosely journaled to the hopper $a^6$. This agitator $b$, is provided with a peripheral rack $b^2$, as illustrated in Fig. 1, for a pinion $b^3$, carried on the end of a shaft $b^4$, to engage the said rack. The shaft $b^4$, is journaled in a bearing $b^5$, secured to the surrounding walls of the trough $a^2$, and gutter $a^3$, as clearly shown in Fig. 1. The shaft $b^4$, carries a pulley $b^6$, for revolving the pinion $b^3$, from any source of power, not shown, and thereby the rack $b^2$. On the bottom of the agitator and concentrator $b$, are provided lugs or projections $b^{10}$, in several different forms and in staggered relationships, as clearly illustrated in Figs. 3, 4, and 5. In the receptacle $b$, are mounted hoppers $c$ and $c^1$, having outlet throats provided therein. These containers are adapted to contain cyanid of potassium or caustic potash, mixed together in a pulverized condition and for feeding therefrom in regulated quantity to the body of mercury or amalgam formed thereby, in the body $a^2$, so as to hasten the amalgamation of entrained values of ore or pulp supplied thereto. These hoppers $c$ and $c^1$, are respectively provided with screw-feeds $c^2$, whereof the stems $c^3$, are extended through removable caps $c^4$, and carry pin-disks $c^5$, with which the projecting pins $a^{10}$, and $a^{11}$, respectively of the collar $a^9$, of the feed hopper $a^6$, engage step-by-step in the rotation of the deflecting agitator and concentrator $b$, in a manner as hereinbefore fully explained.

In Figs. 4 and 5, the rotating deflecting agitator and concentrator $b$, in conjunction with the staggered lugs or projections $b^{10}$, thereof facilitate agitation of the mercury or amalgam of the trough $a^2$, in conjunction with cone-shaped rollers $d$. These rollers are arranged to revolve by means of rollers $d^1$, $d^1$, carried by the agitator and concentrator $b$, and engaging tracks $d^2$, $d^2$, arranged in the trough $a^2$, as clearly illustrated in Fig. 5. The cone-shaped rollers arranged at suitable distances apart around and from the bottom of the receptacle $b$, in action tend to direct into or commingle entrained values of the wet ore or pulp with the mercury or amalgam body of the trough $a^2$, thus facilitating recovery of such values from the ore or pulp and the tailings or gangue liberated therefrom overflow into the inclined gutter $a^3$, and discharge through the outlet $a^4$, into the discharge spout $a^5$, away from the apparatus.

Having thus described the nature and objects of my invention, what I claim as new and desire to secure by Letters Patent is:—

1. In a concentrating-amalgamator, a trough, a deflecting agitator and concentrator, means to rotate the same, hoppers having feeds mounted in said agitator and concentrator, the stems of the feeds of said hoppers having pin-disks and means to actuate said pin-disks in unison with rotations of said agitator and concentrator.

2. In a concentrating-amalgamator, a trough, a deflecting agitator and concentrator provided with lugs or projections on the bottom, means to rotate the same, hoppers having feeds mounted in said agitator and concentrator, the stems of the feeds of said hoppers having pin-disks and means to actuate said pin-disks in unison with rotations of said agitator and concentrator.

3. In a concentrating-amalgamator, a trough, an agitator and concentrator having staggered lugs or projections on the bottom, means to rotate the same, cone-shaped rollers connected with said agitator and concentrator, hoppers having feeds mounted in said agitator and concentrator and means to actuate step-by-step the feeds of said hoppers in unison with rotations of said agitator and concentrator.

4. In a concentrating-amalgamator, a dish-shaped trough, an agitator and concentrator mounted in said trough having staggered lugs or projections on the bottom, a centrally arranged hopper, screw-feed hoppers mounted in said agitator and concentrator, the stems of the feeds of said hoppers having pin-disks, means connected with said centrally located hopper to permit of step-by-step movement of the pin-disks of said screw-feed hoppers and means to revolve said agitator and concentrator and thereby to cause actuation of the pin-disks of said hoppers.

In witness whereof, I have hereunto set my signature in the presence of two subscribing witnesses.

ROYER LUCKENBACH.

Witnesses:
THOMAS M. SMITH,
ELISABETH A. SHELDRAKE.

---

Copies of this patent may be obtained for five cents each, by addressing the "Commissioner of Patents, Washington, D. C."